United States Patent [19]
Sato et al.

[11] Patent Number: 5,796,536
[45] Date of Patent: Aug. 18, 1998

[54] AUTOMATIC CALIBRATION OF A ROTARY HEAD SWITCHING SIGNAL

[75] Inventors: Naoyuki Sato; Masahiko Nagumo, both of Tokyo; Ryuji Abe, Kanagawa, all of Japan

[73] Assignee: Sony Corporation, Tokyo, Japan

[21] Appl. No.: 702,174

[22] Filed: Aug. 23, 1996

[30] Foreign Application Priority Data

Aug. 28, 1995 [JP] Japan ................... 7-242568

[51] Int. Cl.⁶ .................................... G11B 15/12
[52] U.S. Cl. .................................... 360/61; 360/62
[58] Field of Search .................. 360/61, 62, 63, 360/64, 65, 69, 25, 39

[56] References Cited

U.S. PATENT DOCUMENTS 5,583,648  12/1996  Ichinot et al. ................. 360/32
5,646,795  7/1997   Suzuki ........................ 360/18

*Primary Examiner*—Muhammad N. Edun
*Attorney, Agent, or Firm*—Frommer Lawrence & Haug LLP; William S. Frommer

[57] ABSTRACT

A head switching signal calibrating apparatus includes a rotating reproduction device for reproducing data stored on a magnetic tape and a controller for calibrating a head switching signal as a function of the reproduced data, the rotation of the reproduction device, and reference data.

15 Claims, 5 Drawing Sheets

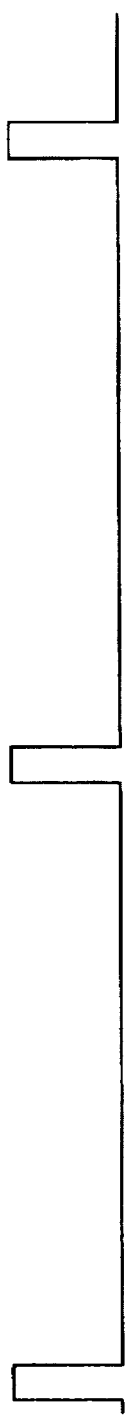
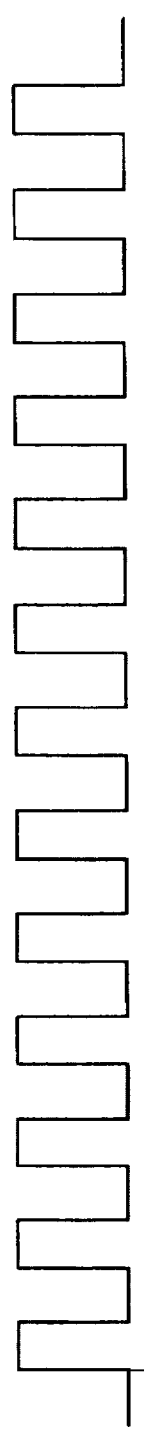
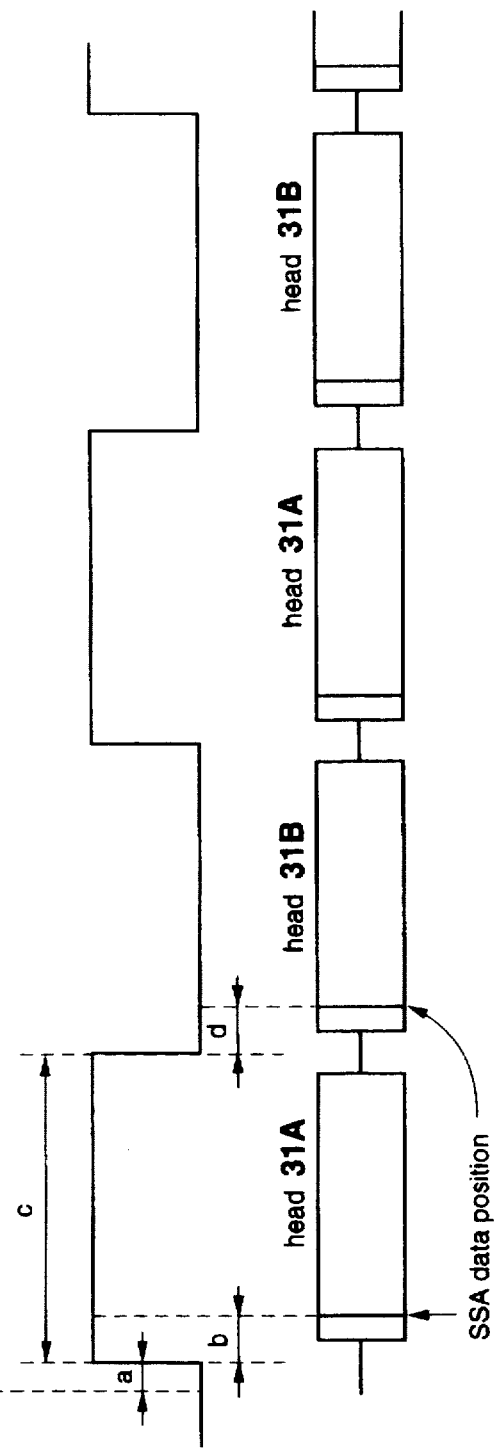
FIG. 4A drum PG
FIG. 4B drum FG
FIG. 4C SWP signal
FIG. 4D data signal

AUTOMATIC CALIBRATION OF A ROTARY HEAD SWITCHING SIGNAL

BACKGROUND OF THE INVENTION

This invention relates to a method of and apparatus for generating a calibrated switching signal for switching among multiple rotary heads in a video tape recording/reproduction system. More specifically, this invention relates to a method of and apparatus for generating a digitally calibrated switching signal.

In the prior art, an apparatus for recording/reproducing video signals from a magnetic tape utilizes multiple rotary heads for transferring video signals to or from the magnetic tape. Within the apparatus, the rotary heads are positioned on a rotary drum which rotates at a speed PG. As the rotary drum rotates, the recording or reproducing operation of each rotary head is periodically switched on and off. For example, in a video signal reproduction operation, the rotary heads may be switched prior to reproduction of video signals corresponding to the 5th horizontal line situated immediately before a vertical synchronization signal.

A prior art switching signal generator 10 is illustrated in FIG. 1A. FIG. 1B illustrates a timing diagram showing the operation of the prior art generator in connection with a magnetic tape 12. Switching signal generator 10 includes a rotary drum 14, a drum speed detector 16, delay circuits 18 and 22, monostable multivibrators 20 and 24, OR gate 26, and flip flop 28. As rotary drum 14 rotates, its speed of rotation is detected by drum speed detector 16. Detector 16 produces a pulse signal PG representative of the speed of the drum which is supplied to delay circuits 18 and 22.

In response to pulse signal PG, delay circuit 18 produces a pulse signal A having a relatively narrow width and delay circuit 22 produces a pulse signal B having a relatively wide width. The widths of the pulse signals produced by delay circuits 18 and 22 are each adjustable by a user. Pulse signal A is supplied to monostable multivibrator 20 and pulse signal B is supplied to monostable multivibrator 24.

In response to the falling edge of pulse signal A, multivibrator 20 produces a pulse signal C. In response to the falling edge of pulse signal B, multivibrator 24 produces a pulse signal D. OR gate 26 combines pulse signals C and D according to a logical OR function to produce pulse signal E. Signal E is supplied to flip flop 28 which produces switching pulse signal F. The leading edge of pulse signal F coincides with the leading edge of pulse signal C, while the falling edge of pulse signal F coincides with the leading edge of pulse signal D.

To calibrate switching pulse signal F, a manufacturer supplies a reference tape (not shown) to apparatus 10 for reproduction. Apparatus 10 reproduces reference video signals from the reference tape and displays the reference video signals to the manufacturer. Based on the displayed reference video signals, the manufacturer manually calibrates switching pulse signal F by adjusting the respective delay periods of delay circuits 18 and 22. This manual calibration process is repeated for each apparatus 10 produced by the manufacturer.

As a result of environmental conditions and the effects of aging, the performance of components of apparatus 10 tends to deteriorate, causing switching pulse signal F to lose its original calibration. Such loss of calibration adversely affects the recording/reproduction operations of apparatus 10.

OBJECTS AND SUMMARY OF THE INVENTION

An object of the present invention is to provide apparatus for generating automatically calibrated switching signals for a rotary head system.

Another object of the present invention is to provide apparatus for calibrating switching signals for a rotary head system with high precision but without employing a reference tape.

A further object of the present invention is to provide apparatus for calibrating switching signals for a rotary head system which automatically produces calibrated switching signals despite the adverse effects of time and environmental conditions, such as temperature variations, upon the components of such apparatus.

Yet another object of the present invention is to provide apparatus for automatically calibrating switching signals for a rotary head system with signals reproduced from a magnetic tape which stores ordinary audio and video signals.

In accordance with an aspect of the present invention, a head switching signal calibrating apparatus is provided. The apparatus includes a rotating reproduction device for reproducing a datum stored on a magnetic tape and for supplying a rotation information signal and a controller device for calibrating a head switching signal as a function of the reproduced datum, the rotation information signal, and a reference datum.

In accordance with another aspect of the present invention, a method for calibrating a head switching signal is provided. The method includes the steps of reproducing with a rotating reproduction device a datum stored on a magnetic tape; supplying a rotation information signal; and calibrating a head switching signal as a function of the reproduced datum, the rotation information signal, and a reference datum.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIGS. 4A, 4B, 4C, and 4D are timing diagrams to which reference will be made in describing the operation of the signal generator of FIG. 2;

DETAILED DESCRIPTION OF THE PREFERRED EMBODIMENTS

Figure 1A:
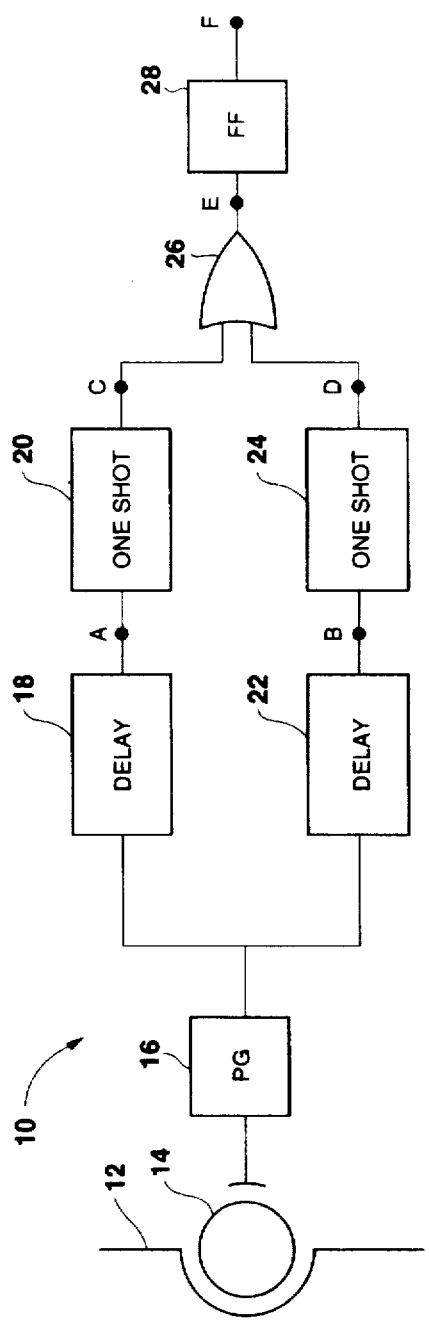
FIG. 1A is a block diagram of a prior art switching signal generator.
Figure 1B:
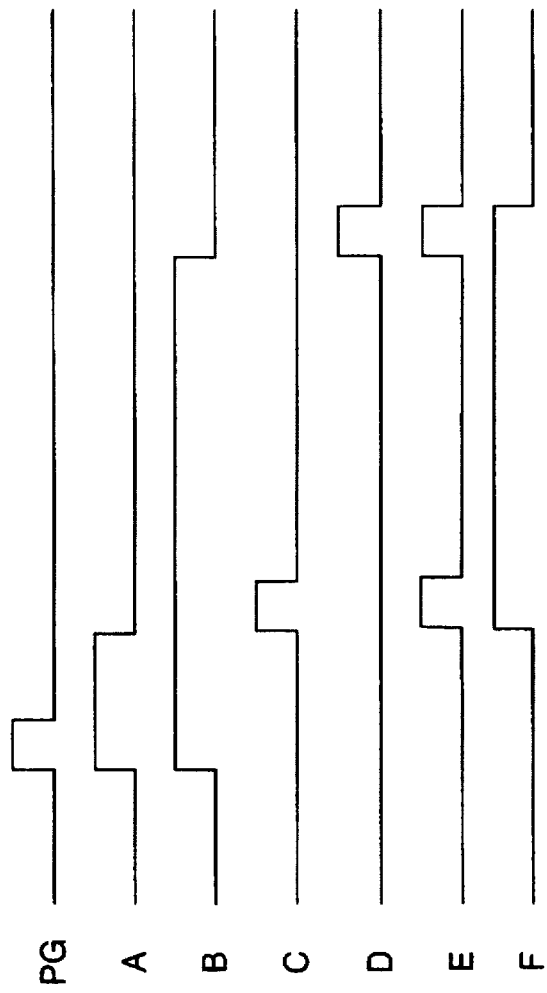
FIG. 1B is a timing diagram to which reference will be made in describing the operation of the signal generator of FIG. 1.
Figure 2:
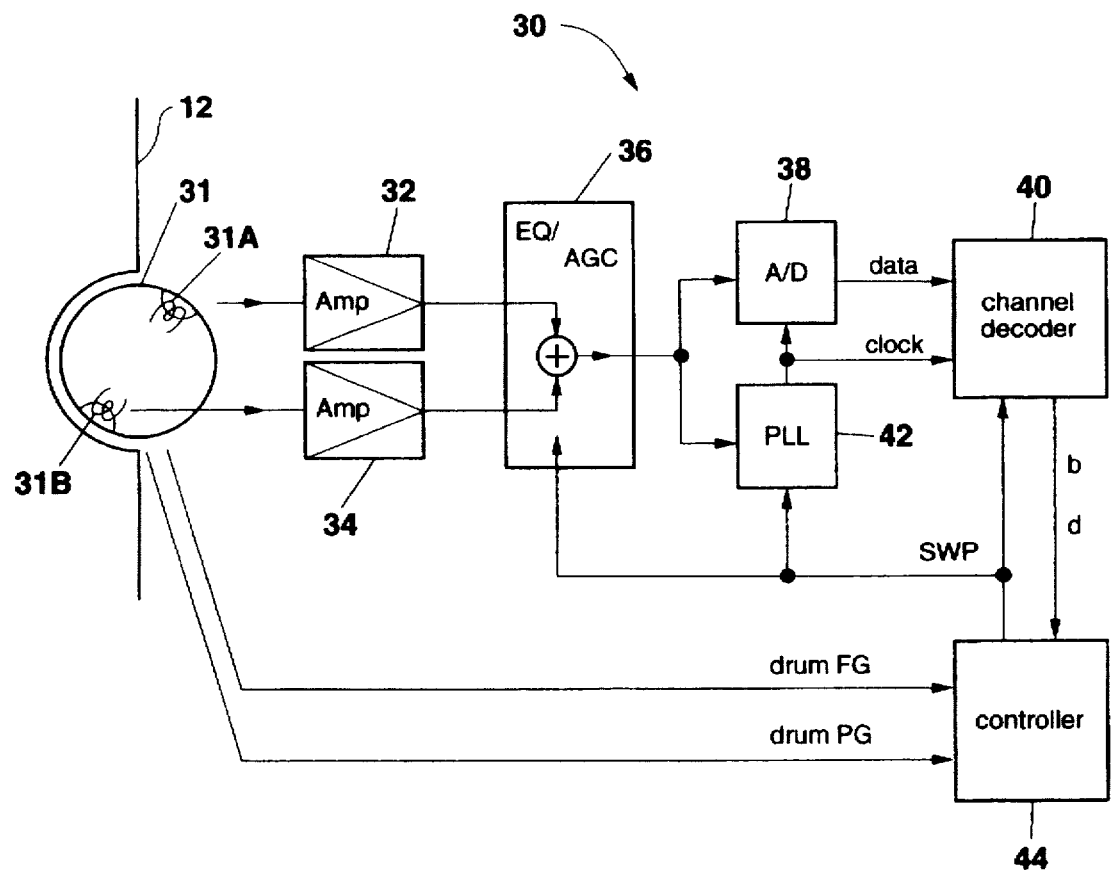
FIG. 2 is a block diagram of a switching signal generator according to the present invention.

FIG. 2 illustrates an embodiment of the recording/reproducing apparatus 30 according to the present invention. The apparatus 30 includes a rotary drum system 31, signal amplifiers 32 and 34, an EQ/AGC circuit 36, an analog-to-digital (A/D) converter 38, a channel decoder 40, a phase-locked loop (PLL) 42, and a controller 44.

Rotary drum system 31 is a dual-head rotary drum system incorporating recording/reproducing heads 31A and 31B on the outer periphery of a rotary drum. Heads 31A and 31B are conventional recording/reproducing heads which may record video signals on a magnetic tape 12 and reproduce video signals therefrom. Reproduced video signals are supplied to amplifiers 32 and 34. As the rotary drum rotates, rotary drum system 31 outputs to controller 44 a drum FG pulse representative of the speed of rotation and a drum PG pulse representative of the phase of rotation (or angular position of the drum). Rotary drum system 31 may include a device (not shown) for measuring the speed and phase of rotation of the drum.

Amplifiers 32 and 34 are conventional video signal amplifiers. EQ/AGC circuit 36 is a signal equalizer, automatic gain control, and signal synthesis device. The equalizing and gain control functions of circuit 36 are similar to those of conventional EQ/AGC devices. A/D converter 38 is a conventional analog-to-digital signal converter for converting reproduced video signals into digital data.

Channel decoder 40 is a video data demodulator which demodulates digitized video data and functions as a data analyzer for determining the difference between the head switching pulse signal and component portions of the digitized video data. PLL 42 is a switching phase-locked loop device for tracking multiple frequencies in a signal and for generating a clock signal.

Controller 44 is a control device for generating a head switching pulse signal (SWP) for controlling EQ/AGC circuit 36, PLL 42, and channel decoder 40. Controller 44 may comprise a semiconductor controller circuit, a microprocessor, a microcomputer, or the like.

Figure 3:
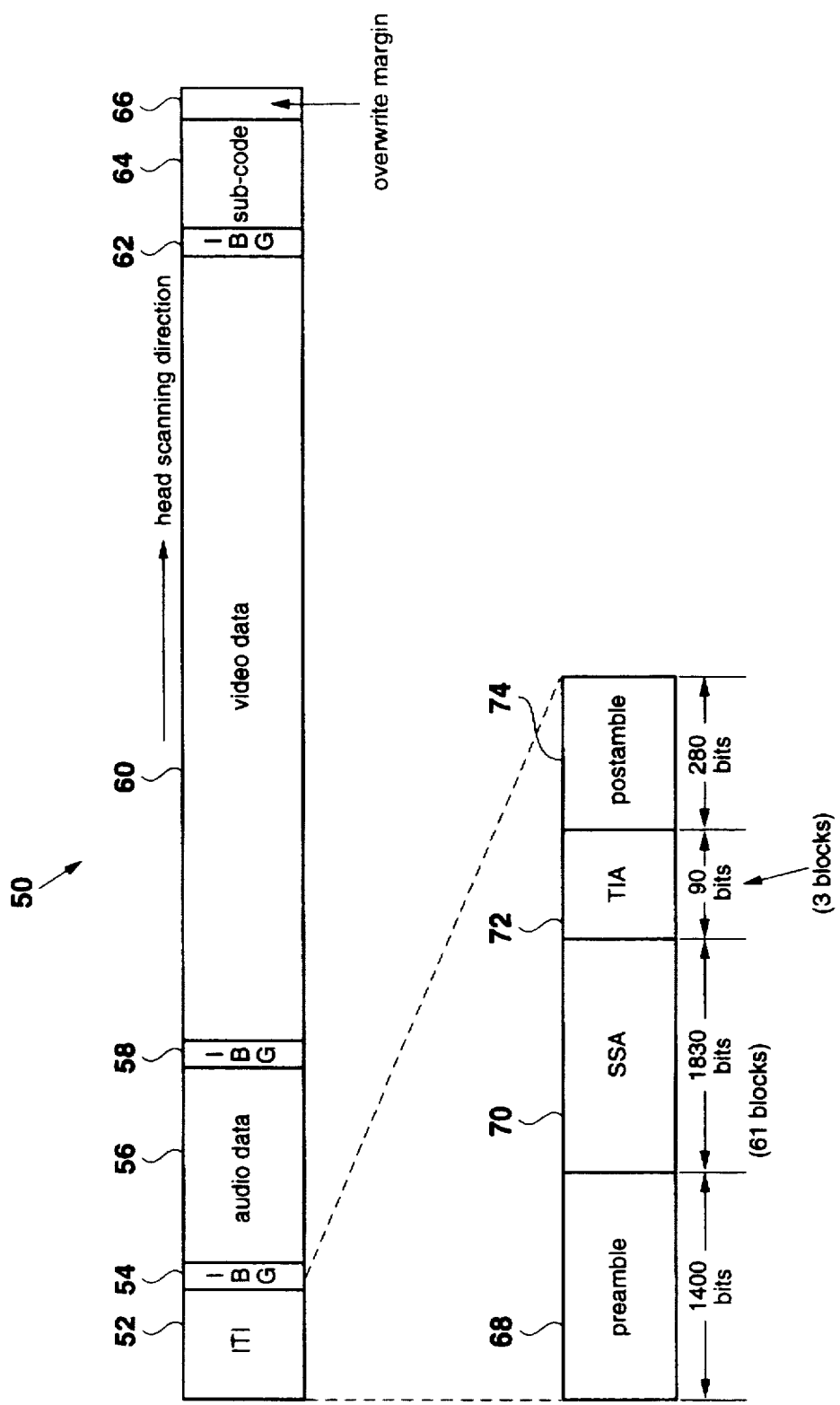
FIG. 3 is a storage format diagram to which reference will be made in describing the operation of the signal generator of FIG. 2.

FIG. 3 illustrates a data format 50 for data recorded on a magnetic tape for use in connection with the apparatus of FIG. 2. Preferably, the illustrated data format 50 corresponds to one track of recorded data. Shown from left to right, e.g. head entrance (rush in) to head exit (separation), data format 50 comprises an insert and track information (ITI) area 52, a first interblock gap (IBG) area 54, an area for storing audio data 56, a second interblock gap (IBG) area 58, an area for storing video data 60, a third interblock gap (IBG) area 62, an area for storing sub-code data 64, and an overwrite margin area 66. The data stored according to format 50 may be rewritable in a dubbing or postrecording operation.

ITI area 52 includes a preamble area 68, a start synch block area (SSA) 70, a track identification area (TIA) 72, and a postamble area 74. Preferably, preamble area 68 stores 1400 bits of information while postamble area 74 stores 280 bits of information. Both preamble area 68 and postamble area 74 preferably store a pulse signal having the same frequency as that of the data recorded therebetween. SSA 70 preferably stores 1830 bits of information, e.g. 61 blocks. TIA 72 preferably stores 90 blocks of information, e.g. 3 blocks. A "block" preferably comprises three ten-bit words; the head word arranged by a predetermined sync pattern (ITI-Sync) and the remaining two words arranged by identification data.

The arrangement of data in the ITI area, specifically the fixed location of SSA 70, facilitates the detection of a synch block in SSA 70 for reference in determining the proper timing of a head switching pulse signal. Preferably, a 30th synch block in SSA 70 is utilized as the reference.

Optionally, one or more of the data storage areas in format 50, e.g. areas 56, 60, or 64, may include a preamble area and a postamble area for storing a pulse signal having the same frequency as that of the data recorded therebetween.

Each of IBG areas 54, 58, and 62, along with overwrite margin area 66, serves as a margin area where, preferably, no data is stored. Overwrite margin area 66 may accommodate the effects of jitter.

In a reproduction operation by recording/reproducing apparatus 30, a magnetic tape 12 is wound around approximately half, e.g. approximately 180 degrees, of the rotary drum in rotary drum system 31. As the rotary drum rotates, heads 31A and 31B engage portions of magnetic tape 12 for the reproduction of video signals recorded on tape 12 and supply the reproduced video signals to signal amplifiers 32 and 34, respectively. Rotary drum system 31 supplies signals representing drum speed (drum FG) and drum phase (drum PG) to controller 44.

Signal amplifiers 32 and 34 amplify the respective reproduced video signals to produce respective amplified video signals which are supplied to EQ/AGC circuit 36. EQ/AGC circuit 36 equalizes and automatically adjusts the gain of the amplified video signals to produce segments of processed video signals. In accordance with a head switching pulse signal (SWP) supplied from controller 44, circuit 36 switches between and synthesizes the segments of processed video signals to produce a synthesized video signal comprising temporally arranged segments of processed video signals. The synthesized video signal is supplied to A/D converter 38 and PLL 42.

A/D converter 38 converts the synthesized video signals into a digital form and supplies the digitized synthesized video signals to channel decoder 40. The conversion operation is synchronized according to a clock signal produced by PLL 42.

PLL 42 locks upon multiple frequencies in the synthesized video signal and, as a function of such, generates a clock signal which is supplied to A/D converter 38 and channel decoder 40. Preferably, PLL 42 locks upon the pulse signal located in a preamble or postamble area, e.g. preamble area 68 or postamble area 74, incorporated into a track of synthesized video data and generates a bit clock as a function of the locked frequency. In response to the head switching pulse signal, PLL 42 switches the frequency at which it locks upon the synthesized video signals. Different lock frequencies may be attributable to the reproduction of data by different recording/reproducing heads and to different modes of video signal reproduction.

Channel decoder 40 demodulates digitized video data and calculates time difference values between the timing of the head switching pulse signal and the timing of synch block data stored in a start synch block area (SSA 70) incorporated in the digitized synthesized video signals. Decoder 40 may utilize a reference clock to determine such time difference values.

As a function of drum speed, drum phase, a predetermined reference signal format, and the time difference values calculated by decoder 40, controller 44 generates a head switching pulse signal (SWP). Specifically, controller 44 determines the timing for the rising edge and for the falling edge of the head switching pulse signal. The operation of channel decoder 40 and controller 44 will be described in further detail with reference to the timing diagrams of FIGS. 4A, 4B, 4C, and 4D.

FIG. 4A illustrates a timing diagram for a drum PG signal in which a drum PG pulse occurs once during each complete rotation of the rotary drum in rotary drum system 31. FIG. 4B illustrates a timing diagram for a drum FG signal in which a drum FG pulse occurs six times during each complete rotation of the rotary drum in rotary drum system 31.

FIG. 4C illustrates a timing diagram for a head switching pulse (SWP) signal produced by controller 44.

FIG. 4D illustrates a timing diagram for the digitized synthesized video signals supplied to channel decoder 40. As shown, the digitized synthesized video signals preferably comprise alternating segments of video signals reproduced by recording/reproducing heads 31A and 31B. Also as shown, each segment of video signals includes start synch block area data at a specific location within the segment.

As shown in FIG. 4C, channel decoder 40 calculates time difference value "b" as the period of time between the rising edge of a head switching pulse and a reference synch block in start synch block data contained in a segment of digitized synthesized reproduced video signals. Also as shown, channel decoder 40 calculates time difference value "d" as the period of time between the falling edge of a head switching pulse and a reference synch block in start synch block data contained in a subsequent segment of digitized synthesized reproduced video signals. Channel decoder 40 supplies time difference values "b" and "d" to controller 44.

As illustrated in FIGS. 4A, 4B, and 4C, controller 44 initiates the rising edge of a head switching pulse following a time delay "a" subsequent to the rising edge of a first drum FG pulse which follows the rising edge of a drum PG pulse. Controller 44 causes the falling edge of the head switching pulse to occur after a period of time "c". Controller 44 determines values for time delay "a" and time period "c" as a function of time difference values "b" and "d" supplied by channel decoder 40.

Controller 44 is prestored with a predetermined reference signal format (not shown) which includes a reference time difference value "b0" corresponding to time difference value "b" and includes a reference time difference value "d0" corresponding to time difference value "d". Controller 44 determines a value for time delay "a" such that time difference value "b" will equal reference time difference value "b0", and accordingly controls the position of the leading edge of a head switching pulse. Controller 44 determines a value for time period "c" such that time difference value "d" will equal reference time difference value "d0", and accordingly controls the position of the falling edge of the head switching pulse.

In accordance with the above described process, controller 44 produces a head switching pulse signal which is automatically calibrated according to a predetermined reference signal format.

Figure 5:
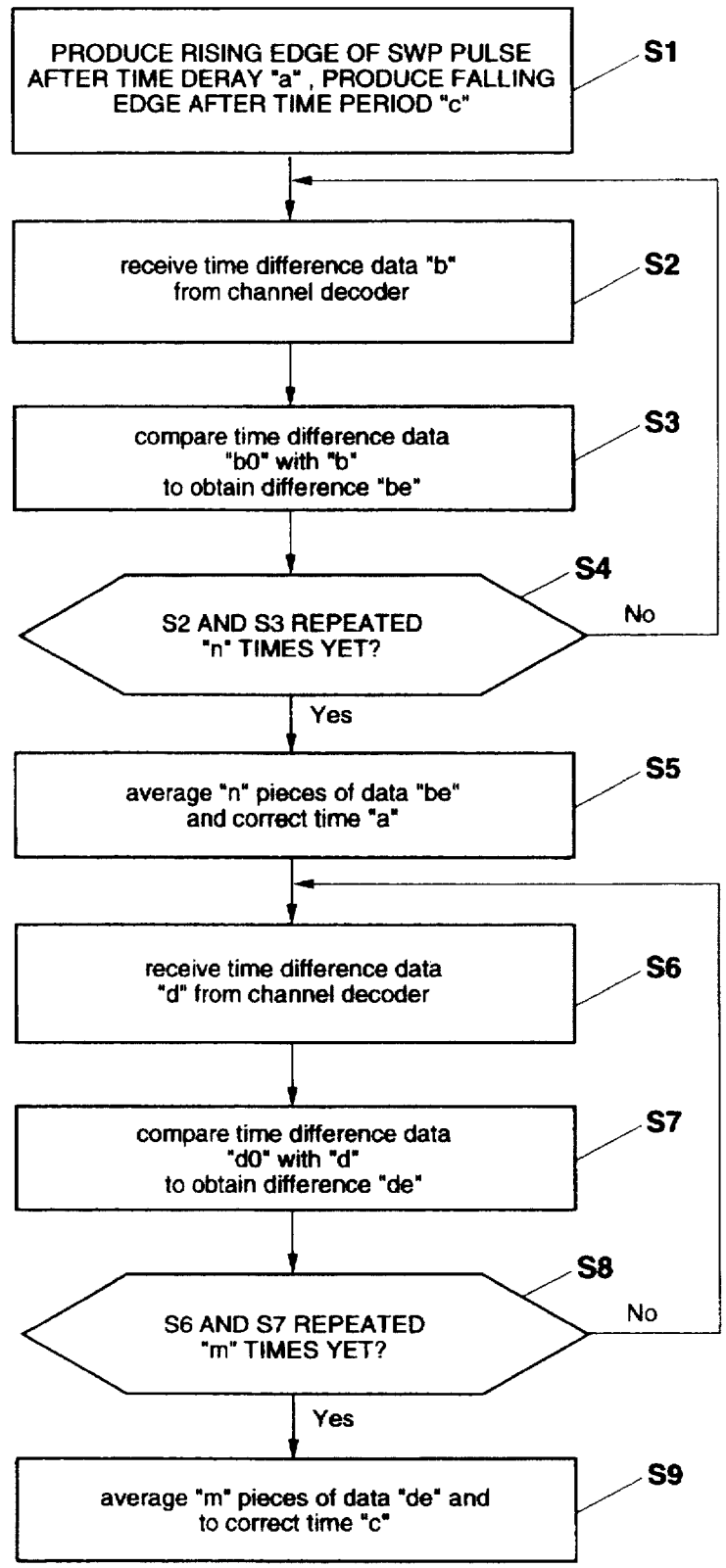
FIG. 5 is a flow chart diagram.

A preferred operation of controller 44 is illustrated in the flow chart of FIG. 5. In step S1, following detection of the rising edge of a drum PG pulse and then detection of the rising edge of a drum FG pulse, a rising edge of a head switching pulse is produced after a time delay "a". The falling edge of the head switching pulse is produced a period of time "c" following the production of the rising edge. Processing continues with step S2.

In step S2, time difference value "b" is received from channel decoder 40. Following step S2, in step S3, time difference value "b" is compared with reference time difference value "b0" to obtain difference "be", e.g. be =b–b0. Processing continues with step S4.

In step S4, controller 44 determines whether steps S2 and S3 have been repeated a number "n" times. After each processing according to steps S2 and S3 occurs, a new value "be" is produced and stored individually by controller 44. If steps S2 and S3 have not been repeated "n" times, then processing returns to step S2; otherwise, processing continues with step S5.

In step S5, the "n" values of "be" that have been stored by controller 44 are retrieved and averaged together to produce an "average be". Controller 44 adjusts the value of time delay "a" so that subsequently calculated values for "average be" will equal zero. For example, if "average be" is positive, then time delay "a" is increased. Conversely, if "average be" is negative, then time delay "a" is decreased.

In step S6, time difference value "d" is received from channel decoder 40. Following step S6, in step S7, time difference value "d" is compared with reference time difference value "d0" to obtain difference "de", e.g. de=d–d0. Processing continues with step S8.

In step S8, controller 44 determines whether steps S6 and S7 have been repeated a number "m" times. After each processing according to steps S6 and S7 occurs, a new value "de" is produced and stored individually by controller 44. If steps S2 and S3 have not been repeated "m" times, then processing returns to step S6; otherwise, processing continues with step S9.

In step S9, the "m" values of "de" that have been stored by controller 44 are retrieved and averaged together to produce an "average de". Controller 44 adjusts the value of time period "c" so that subsequently calculated values for "average de" will equal zero. For example, if "average de" is positive, then time period "c" is increased. Conversely, if "average de" is negative, then time period "c" is decreased.

Optionally, following step S9, processing according to steps S2–S9 may be repeated a predetermined number of times.

Figure 6:
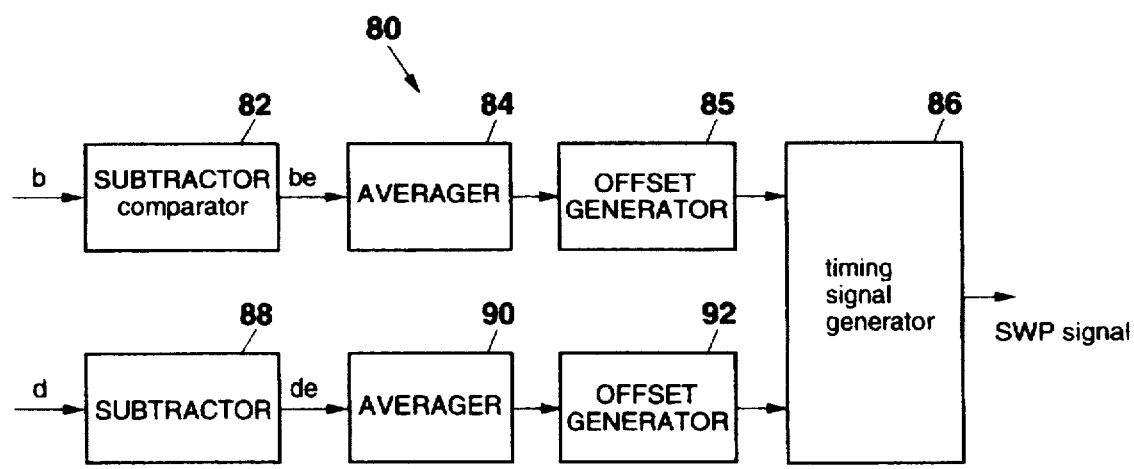
FIG. 6 is block diagram of an embodiment of a controller according to the present invention.

An embodiment 80 of controller 44 is illustrated in FIG. 6. Embodiment 80 of controller 44 includes subtractors 82 and 88, averagers 84 and 90, offset generators 85 and 92, and timing signal generator 86. Subtractor 82 is supplied with time difference value "b" and subtracts reference time difference value "b0", stored internally, from value "b" to produce a difference value "be". Difference value "be" is supplied to averager 84.

Averager 84 stores "be" values supplied by subtractor 82 and averages the stored "be" values once "n" such values have been accumulated to produce an "average be" value. The "average be" value is supplied to offset generator 85. Offset generator 85 converts the "average be" value into an offset value for time delay "a". The offset value is supplied to timing signal generator 86.

Subtractor 88 is supplied with time difference value "d" and subtracts reference time difference value "d0", stored internally, from value "d" to produce a difference value "de". Difference value "de" is supplied to averager 90.

Averager 90 stores "de" values supplied by subtractor 88 and averages the stored "de" values once "m" such values have been accumulated to produce an "average de" value. The "average de" value is supplied to offset generator 92. Offset generator 92 converts the "average de" value into an offset value for time period "c". The offset value is supplied to timing signal generator 86.

In response to the offset value supplied by offset generator 85, timing signal generator 86 adjusts the temporal position of the leading edge of the next head switching pulse. In response to the offset value supplied by offset generator 92, timing signal generator 86 also adjusts the temporal position of the falling edge of that next head switching pulse. In this manner, time difference values "b" and "d" are calibrated with reference time difference values "b0" and "d0", respectively.

In an alternative mode of operation, channel decoder 40 may utilize reproduced signals other than start synch block data stored in SSA 70 for calculating time difference values "b" and "d". For example, track identification data stored in TIA 72 may be utilized by channel decoder 40. In another alternative mode of operation, other calibrated control signals relating to the track position of data, such as dubbing timing control signals, are produced by controller 44 according to the processes described hereinabove.

Furthermore, higher precision calibration of the head switching pulse signal may be achieved by increasing the number of drum FG pulses produced per revolution of the rotary drum. Still further, controller 44 may produce control signals that are synchronized in a different manner with respect to the speed and phase of the rotary drum, e.g. rely upon different drum PG and drum FG pulses or components thereof. Optionally, the head switching pulse signal may be supplied to rotary drum system 31 to synchronize its operation.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A head switching signal calibrating apparatus comprising:
    rotating reproduction means for reproducing a datum stored on a magnetic tape and for supplying a rotation information signal; and
    controller means for calibrating a head switching signal as a function of the reproduced datum, said rotation information signal, and a reference datum.

2. Apparatus according to claim 1 wherein said rotating reproduction means comprises a plurality of recording/reproducing heads.

3. Apparatus according to claim 1 wherein said rotation information signal comprises a speed information signal.

4. Apparatus according to claim 1 wherein said rotation information signal comprises a phase information signal.

5. Apparatus according to claim 1 wherein said controller means comprises generating means for generating said head switching signal.

6. Apparatus according to claim 1 wherein said controller means comprises subtractor means for calculating a difference between said reproduced datum and said reference datum.

7. Apparatus according to claim 6 wherein said controller means further comprises averaging means for averaging said difference with a plurality of calculated differences.

8. Apparatus according to claim 7 wherein said controller means further comprises adjustment means for adjusting a characteristic of said head switching signal.

9. A method for calibrating a head switching signal, said method comprising the steps of:
    reproducing with a rotating reproduction device a datum stored on a magnetic tape;
    receiving a rotation information signal; and
    calibrating a head switching signal as a function of the reproduced datum, said rotation information signal, and a reference datum.

10. Method according to claim 9 wherein said rotation information signal comprises a speed information signal.

11. Method according to claim 9 wherein said rotation information signal comprises a phase information signal.

12. Method according to claim 9 further comprising the step of generating said head switching signal.

13. Method according to claim 9 further comprising the step of calculating a difference between said reproduced datum and said reference datum.

14. Method according to claim 13 further comprising the step of averaging said difference with a plurality of calculated differences.

15. Method according to claim 14 wherein said step of calibrating comprises the step of adjusting a characteristic of said head switching signal.

* * * * *